(12) United States Patent
Moubayed et al.

(10) Patent No.: US 11,102,630 B2
(45) Date of Patent: Aug. 24, 2021

(54) METHOD FOR SERVICE PLACEMENT IN A MULTI-ACCESS/MOBILE EDGE COMPUTING (MEC) SYSTEM

(71) Applicants: Abdallah Moubayed, London (CA); Abdallah Shami, London (CA); Parisa Heidari, Saint-Laurent (CA); Adel Larabi, Pierrefonds (CA); Richard Joseph Brunner, Montreal (CA)

(72) Inventors: Abdallah Moubayed, London (CA); Abdallah Shami, London (CA); Parisa Heidari, Saint-Laurent (CA); Adel Larabi, Pierrefonds (CA); Richard Joseph Brunner, Montreal (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/664,228

(22) Filed: Oct. 25, 2019

(65) Prior Publication Data
US 2021/0127241 A1     Apr. 29, 2021

(51) Int. Cl.
*H04W 4/40*     (2018.01)
*G06F 17/11*    (2006.01)
(Continued)

(52) U.S. Cl.
CPC ............ *H04W 4/40* (2018.02); *G06F 17/11* (2013.01); *H04L 67/10* (2013.01); *H04W 24/08* (2013.01);
(Continued)

(58) Field of Classification Search
CPC ........ H04W 4/40; H04W 24/08; H04L 67/10; G06F 17/11; G06F 9/45558; G06F 2009/45595
See application file for complete search history.

(56) References Cited

U.S. PATENT DOCUMENTS 8,180,871 B2    5/2012   Brittenham et al.
9,137,161 B2    9/2015   Zhang et al.
(Continued)

OTHER PUBLICATIONS

X. Yu, M. Guan, M. Liao and X. Fan, "Pre-Migration of Vehicle to Network Services Based on Priority in Mobile Edge Computing," in IEEE Access, vol. 7, pp. 3722-3730, 2019, Date of Publication: Dec. 25, 2018 (Year: 2018).*

(Continued)

*Primary Examiner* — David R Lazaro
(74) *Attorney, Agent, or Firm* — Ericsson Canada Inc.; Julie Dufort (57) ABSTRACT

The disclosure relates to a method, an apparatus and a non-transitory computer readable media for service placement in a multi-access/mobile edge computing (MEC) system, comprising: iteratively, for each subset of services or applications $s_u$ of each type u, u being element of a set of U of unique V2X services or applications sorted in order of latency requirement: calculating an average latency for the subset of services or applications $s_u$; selecting a node c providing a latency smaller than or equal to the calculated average latency and providing enough capacity to run the subset of services or applications $s_u$; placing the subset of services or applications $s_u$ on the node c; and updating a list of available nodes.

21 Claims, 7 Drawing Sheets

(51) Int. Cl.
  *H04L 29/08* (2006.01)
  *H04W 24/08* (2009.01)
  *G06F 9/455* (2018.01)
(52) U.S. Cl.
  CPC ............... *G06F 9/45558* (2013.01); *G06F 2009/45595* (2013.01)

(56) References Cited

U.S. PATENT DOCUMENTS

| | | | |
|---|---|---|---|
| 9,391,905 | B2 | 7/2016 | Zhang et al. |
| 10,432,711 | B1* | 10/2019 | Greenwood ............ H04L 67/42 |
| 10,440,096 | B2* | 10/2019 | Sabella ................ H04L 47/762 |
| 2015/0127783 | A1* | 5/2015 | Lissack ............... G06F 9/45533 709/220 |
| 2016/0226745 | A1* | 8/2016 | Tran .................... H04L 43/0852 |
| 2018/0183855 | A1* | 6/2018 | Sabella ................ H04L 47/803 |
| 2019/0045033 | A1* | 2/2019 | Agerstam ............. H04L 63/101 |
| 2019/0132709 | A1* | 5/2019 | Graefe .................... H04W 4/38 |
| 2019/0141142 | A1 | 5/2019 | Filippou et al. |
| 2019/0273624 | A1* | 9/2019 | Hoffmann ............... H04L 12/14 |
| 2019/0319868 | A1* | 10/2019 | Svennebring ......... H04L 41/147 |
| 2020/0008044 | A1* | 1/2020 | Poornachandran ........................ G01C 21/3461 |
| 2020/0076875 | A1* | 3/2020 | Sabella ................ G06F 9/5027 |
| 2020/0296155 | A1* | 9/2020 | McGrath ................ G06F 9/547 |

OTHER PUBLICATIONS

L. Yala, P. A. Frangoudis and A. Ksentini, "Latency and Availability Driven VNF Placement in a MEC-NFV Environment," 2018 IEEE Global Communications Conference (GLOBECOM), Abu Dhabi, United Arab Emirates, 2018, pp. 1-7 (Year: 2018).*
W. Wang, Y. Zhao, M. Tornatore, A. Gupta, J. Zhang and B. Mukherjee, "Virtual machine placement and workload assignment for mobile edge computing," 2017 IEEE 6th International Conference on Cloud Networking (CloudNet), Prague, 2017, pp. 1-6 (Year: 2017).*
B. Gao, Z. Zhou, F. Liu and F. Xu, "Winning at the Starting Line: Joint Network Selection and Service Placement for Mobile Edge Computing," IEEE INFOCOM 2019—IEEE Conference on Computer Communications, Paris, France, 2019, pp. 1459-1467 (Year: 2019).*
Z. Machardy et al.: "V2X Access Technologies: Regulation, Research, and Remaining Challenges", IEEE Communications Surveys & Tutorials, vol. 20, No. 3, Third Quarter 2018.
3GPP TR 22.885 V14.0.0 (Dec. 2015): "3rd Generation Partnership Project; Technical Specification Group Services and System Aspects; Study on LTE support for Vehicle to Everything (V2X) services", 50 pages.
ETSI TR 102 638 V1.1.1 (Jun. 2009): "Intelligent Transport Systems (ITS); Vehicular Communications; Basic Set of Applications; Definitions", 81 pages.
D. Sabella et al.: "A Hierarchical MEC Architecture: Experimenting the RAVEN Use-Case", 2018 IEEE 87th. Vehicular Technology Conference (VTC Spring), Jun. 2018, 5 pages.
W. Balid et al.: "Intelligent Vehicle Counting and Classification Sensor for Real-Time Traffic Surveillance", IEEE Transactions on Intelligent Transportation Systems, vol. 19, No. 6, pp. 1784-1794, 2018.

N. Bissmeyer: "Security in Hybrid Vehicular Communication based on ITS-G5, LTE-V, and Mobile Edge Computing", AmE 2018-Automotive meets Electronics; 9th GMM-Symposium. VDE, 2018, pp. 1-6.
A. Moubayed et al.: "Edge-enabled V2X Service Placement for Intelligent Transportation Systems", Submitted to EEE Transactions on Mobile Computing, 2019, 12 pages.
D. Martin-Sacristan et al.: "Evaluation of LTE-Advanced Connectivity Options for the Provisioning of V2X Services", 2018 IEEE Wireless Communications and Networking Conference (WCNC), Apr. 2018, pp. 1-6.
ETSI EN 302 637-2 V1.3.2 (Nov. 2014): Intelligent Transport Systems (ITS); Vehicular Communications; Basic Set of Applications; Part 2: Specification of Cooperative Awareness Basic Service, 44 pages.
Z. Amjad et al.: "Low Latency V2X Applications and Network Requirements: Performance Evaluation", 2018 IEEE Intelligent Vehicles Symposium (IV), Jun. 2018, pp. 220-225.
Final draft, ETSI EN 302 637-3 V1.2.1 (Sep. 2014): "Intelligent Transport Systems (ITS); Vehicular Communications Basic Set of Applications; Part 3: Specifications of Decentralized Environmental Notification Basic Service", 650 Route des Lucioles F-06921 Sophia Antipolis Cedex—France, Tech. Rep.,2010.73 pages.
ETSI TS 122 185 V14.3.0 (Mar. 2017): "LTE; Service requirements for V2X services (3GPP TS 22.185 version 14.3.0 Release 14)", 650 Route des Lucioles F-06921 Sophia Antipolis Cedex—France, Tech. Rep., 2017, 16 pages.
Mux: "The Low Latency Live Streaming Landscape in 2019", Jan. 23, 2019, 17 pages.
R. M. Karp: "Reducibility Among Combinatorial Problems", Complexity of computer computations. Springer, 1972, pp. 35-103.
Microsoft, "How to: Change the Size of a Windows Azure Virtual Machine", Aug. 8, 2013, 3 pages.
K. Lee: "Latency of Cellular-Based V2X: Perspectives on TTI-Proportional Latency and TTI-Independent Latency", EEE Access, vol. 5, p. 15800-15809, 2017.
D. Dyachuk: "Buy or Rent? The Cost Model of Hosting in the Cloud and in a Colo!", Nov. 14, 2017, 8 pages.
Federal Communications Commission (FCC): "A Broadband Network Cost Model: A Basis for Public Funding Essential To Bringing Nationwide Interoperable Communications To America's First Responders", OBI Technical Paper No. 2, May 2010, 22 pages.
N. Nikookaran et al.: "Combining Capital and Operating Expenditure Costs in Vehicular Roadside Unit Placement", IEEE Transactions on Vehicular Technology, vol. 66, No. 8, pp. 7317-7331, Aug. 2017.
Ericsson: "Cloud evolution: The era of intent-aware clouds", May 20, 2019. Uploaded from the Internet on Apr. 13, 2021, 7 pages.
C. V. S. C. Consortium et al., "Vehicle Safety Communications Project: Task 3 final report: Identify Intelligent Vehicle Safety Applications Enabled by DSRC", National Highway Traffic Safety Administration, US Department of Transportation, Washington DC, Mar. 2005.
G. Hong et al.: "An Optimal Resource Allocation Mechanism in Vehicular MEC Systems", 2019 International Conference on Networking and Network Applications (NaNA), pp. 34-38.
Q. Yuan et al.: "Toward Efficient Content Delivery for Automated Driving Services: An Edge Computing Solution", IEEE Network, IEEE Service Center, New York, NY, US, vol. 32, No. 1, Jan. 1, 2018, pp. 80-86.
International Search Report and Written Opinion for PCT/IB2020/060002, dated Feb. 5, 2021, 11 pages.

\* cited by examiner

METHOD FOR SERVICE PLACEMENT IN A MULTI-ACCESS/MOBILE EDGE COMPUTING (MEC) SYSTEM

TECHNICAL FIELD

The present disclosure relates to service placement in a multi-access/mobile edge computing (MEC) system.

BACKGROUND

Cloud technologies are evolving towards distributed management approach where cloud management can focus on given key performance indicators (KPIs), determine the operative goals and business intents accordingly, then execute, learn, optimize and adapt with an "intent-aware behavior". In other words, cloud management needs some smart orchestration abilities to provide those intents while increasing operational efficiency.

Vehicle-to-everything (V2X) communication, a cornerstone of intelligent transportation systems (ITSs), has garnered more attention from different entities including governmental agencies and automotive manufacturers due to the many projected benefits of such systems. For example, such systems help reduce traffic-related accidents, introduce new business models, and increase operational efficiency of managing vehicular fleets. On the other hand, considering different aspects of energy consumption, operational efficiency usually goes hand in hand with sustainable energy and green environment optimization. Lack of operational inefficiency causes higher amount of energy consumption which in turn leads to higher amount of carbon footprint and becomes more damaging for the environment.

Additionally, V2X communication helps support new sets of services including autonomous vehicle operation, traffic flow optimization, and in-car entertainment, to name a few. However, offering such services is coupled with maintaining stringent performance requirements. More specifically, end-to-end (E2E) latency/delay (latency and delay may be used interchangeably herein) is an important performance requirement for such services. For example, pre-sense crash warning has a minimum requirement of 20-50 ms E2E latency as per different standardization bodies, such as the European Telecommunications Standards Institute (ETSI).

To that end, multi-access/mobile edge computing (MEC), which makes computing resources and storage available in a nearby proximity to sensors and mobile devices, has been proposed as a viable solution to reduce the E2E latency/delay. As an extension to cloud computing, MEC has been discussed in the context of ITSs and V2X communication, by hosting V2X services and applications on servers with the closest proximity to the end-users to reduce the serving data latency. This in turn can help providers support real-time applications, mobility, and location-aware services.

SUMMARY

In the context of this disclosure, "cost" is defined as comprising at least latency and computational resources. Adopting a distributed cloud/edge computing paradigm introduces new challenges. Firstly, where should the V2X applications and services be place? Not all services can be placed at the edge due to the limited computing and storage capabilities available at edge nodes that allow for lower latencies when hosting services. Secondly, there is the need for operational efficiency associated with hosting such services on edge nodes. Maintenance of the edge nodes is less operationally efficient than the maintenance of cloud nodes, for example, because of the larger number of physical structures needed to deploy and maintain the edge nodes.

Therefore, an optimization model that increases the operational efficiency of hosting V2X services/applications while reducing cost, i.e. optimizing latency and computational resources while meeting computational and placement requirements is formulated as a binary integer linear programming problem.

A low complexity heuristic algorithm named "Delay-aware V2X Service Placement" (DA-VSP) is proposed to solve the V2X service placement problem in a distributed edge/cloud computing environment. The algorithm searches for the computing node with the minimum cost that satisfies the service latency/delay constraint as well as the node's available computing resources constraint.

The proposed solution has multiple advantages. It has low-complexity (in the order of O(|C||S|) where |C| is the number of computing nodes available and |S| is the number of V2X services to place) and it achieves close to optimal performance.

There is provided a method for service placement in a multi-access/mobile edge computing (MEC) system, comprising iteratively, for each subset of services or applications $s_u$ of each type u, u being element of a set of U of unique V2X services or applications sorted in order of latency requirement: calculating an average latency for the subset of services or applications $s_u$; selecting a node c providing a latency smaller than or equal to the calculated average latency and providing enough capacity to run the subset of services or applications $s_u$; placing the subset of services or applications $s_u$ on the node c; and updating a list of available nodes.

There is provided an apparatus for service placement in a multi-access/mobile edge computing (MEC) system comprising processing circuits and a memory, the memory containing instructions executable by the processing circuits whereby the apparatus is operative to: iteratively, for each subset of services or applications $s_u$ of each type u, u being element of a set of U of unique V2X services or applications sorted in order of latency requirement: calculate an average latency for the subset of services or applications $s_u$; select a node c providing a latency smaller than or equal to the calculated average latency and providing enough capacity to run the subset of services or applications $s_u$; place the subset of services or applications $s_u$ on the node c; and update a list of available nodes.

There is provided a non-transitory computer readable media having stored thereon instructions for service placement in a multi-access/mobile edge computing (MEC) system, the instructions comprising: iteratively, for each subset of services or applications $s_u$ of each type u, u being element of a set of U of unique V2X services or applications sorted in order of latency requirement: calculating an average latency for the subset of services or applications $s_u$; selecting a node c providing a latency smaller than or equal to the calculated average latency and providing enough capacity to run the subset of services or applications $s_u$; placing the subset of services or applications $s_u$ on the node c; and updating a list of available nodes.

The method, apparatus and non-transitory computer readable media provided herein present improvements to the way previous method and apparatus operate.

DETAILED DESCRIPTION

Various features will now be described with reference to the figures to fully convey the scope of the disclosure to those skilled in the art.

Sequences of actions or functions may be used within this disclosure. It should be recognized that some functions or actions, in some contexts, could be performed by specialized circuits, by program instructions being executed by one or more processors, or by a combination of both.

Further, computer readable carrier or carrier wave may contain an appropriate set of computer instructions that would cause a processor to carry out the techniques described herein.

The functions/actions described herein may occur out of the order noted in the sequence of actions or simultaneously. Furthermore, in some illustrations, some blocks, functions or actions may be optional and may or may not be executed; these are generally illustrated with dashed lines.

Figure 1:
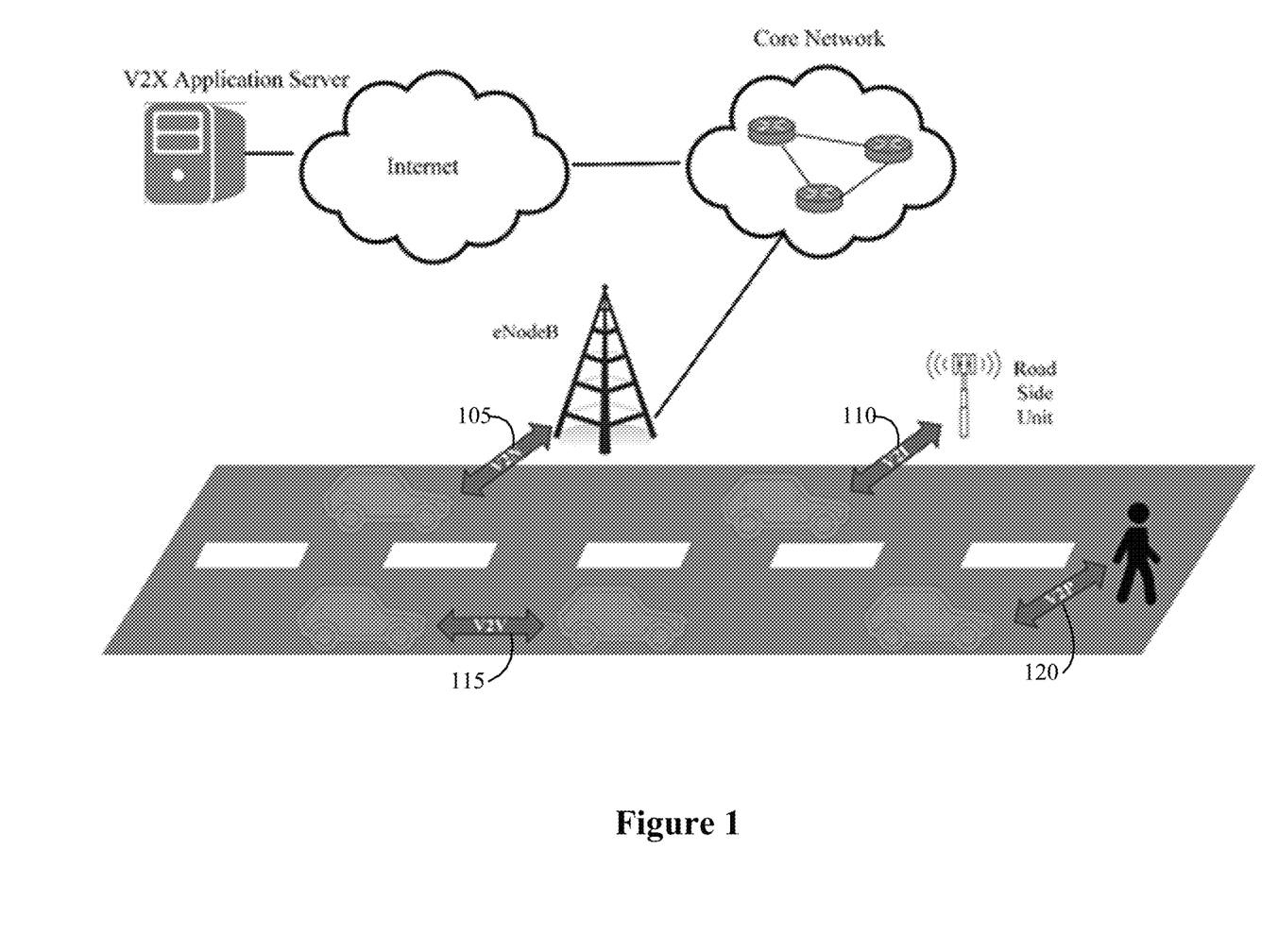
FIG. 1 is a schematic illustration of a system showing different V2X communication modes as proposed by 3rd generation partnership project (3GPP).

Referring to FIG. 1, 3GPP proposed four different communication modes to cover all possible on-road interactions: vehicle-to-network (V2N) 105, vehicle-to-infrastructure (V2I) 110, vehicle-to-vehicle (V2V) 115, and vehicle-to-pedestrian (V2P) 120 communication. Depending on the service or application, a communication mode can be chosen. A brief overview of each of these communication modes is provided below.

V2N Communication 105: V2N communication refers to the communication between a vehicle and a V2X application server. This is typically done using a cellular network such as an long term evolution (LTE) or fifth generation (5G) network. Through this connection, different services such as infotainment, traffic optimization, navigation, and safety can be offered.

V2I Communication 110: V2I communication refers to the communication between a vehicle and roadside infrastructure such as road-side units (RSUs). This mode is typically used to disseminate safety messages to multiple drivers within the RSU's coverage area. Additionally, it can be used to share information at signalized and non-signalized intersections to avoid collisions.

V2V Communication 115: V2V communication refers to the direct communication between two vehicles. Cooperative driving is enabled with this communication mode by exchanging different messages such as collision warning/avoidance, lane change warning, and emergency vehicle warning.

V2P Communication 120: V2P communication refers to the direct communication between vehicles and vulnerable road users (VRUs) such as pedestrians, wheelchair users, bikers, and motorcyclists. Again, this communication mode can be used for road safety. More specifically, both the vulnerable road users and the vehicles are alerted of a possible collisions using this mode.

V2X communications enables a variety of applications and services. Each of these applications and services have different throughput, latency, and frequency requirements. Accordingly, these applications and services are often grouped into four main categories, described below.

Autonomous/Cooperative Driving: Autonomous and cooperative driving mainly focuses on V2V communication between vehicles in close proximity. This particular application has extremely stringent requirements in terms of the communication throughput and latency. More specifically, such an application requires at least 5 Mbps of throughput and less than 10 milliseconds (ms) of latency.

Traffic Safety: Traffic safety represents a more general view of the autonomous/cooperative driving application. Traffic safety applications have many objectives including: reduction in the number and severity of inter-vehicle collisions, protection of vulnerable road users, and reduction of property damage. As can be expected, such applications have very strict requirements. For example, the pre-sense crash warning has a minimum requirement of 20-50 ms of round-trip latency. Additionally, the throughput required for some traffic safety services such as road sign recognition is estimated to be 700 Megabit per second (Mbps).

Traffic Efficiency: Traffic efficiency focus on various tasks such as coordinating intersection timings, planning the route from source to destination for various vehicles, and sharing general information including geographical location of vehicles, people and different other objects as well as road conditions. Such applications often have less strict requirements. For example, the tolerable latencies for such applications ranges between 100-500 ms and the throughput ranges between 10-45 Mbps.

Infotainment: Infotainment applications refers to the set of services that aim to provide general non-driving related information (e.g. location of car rental services) and entertainment (e.g. video streaming). Such applications and services typically have the lowest requirement. For example, latencies up to 1 second can be tolerated. Furthermore, the throughput requirement is estimated to be around 80 Mbps, which is comparable to that of conventional mobile services.

MEC has been discussed as a potential solution and enabler of future networks and systems. By bringing more computational power closer to the users, one goal of MEC is to reduce the experienced latency as well as decrease the signaling overhead in the cloud core. In what follows, a brief description of the MEC concept and its motivation is provided.

Figure 2:
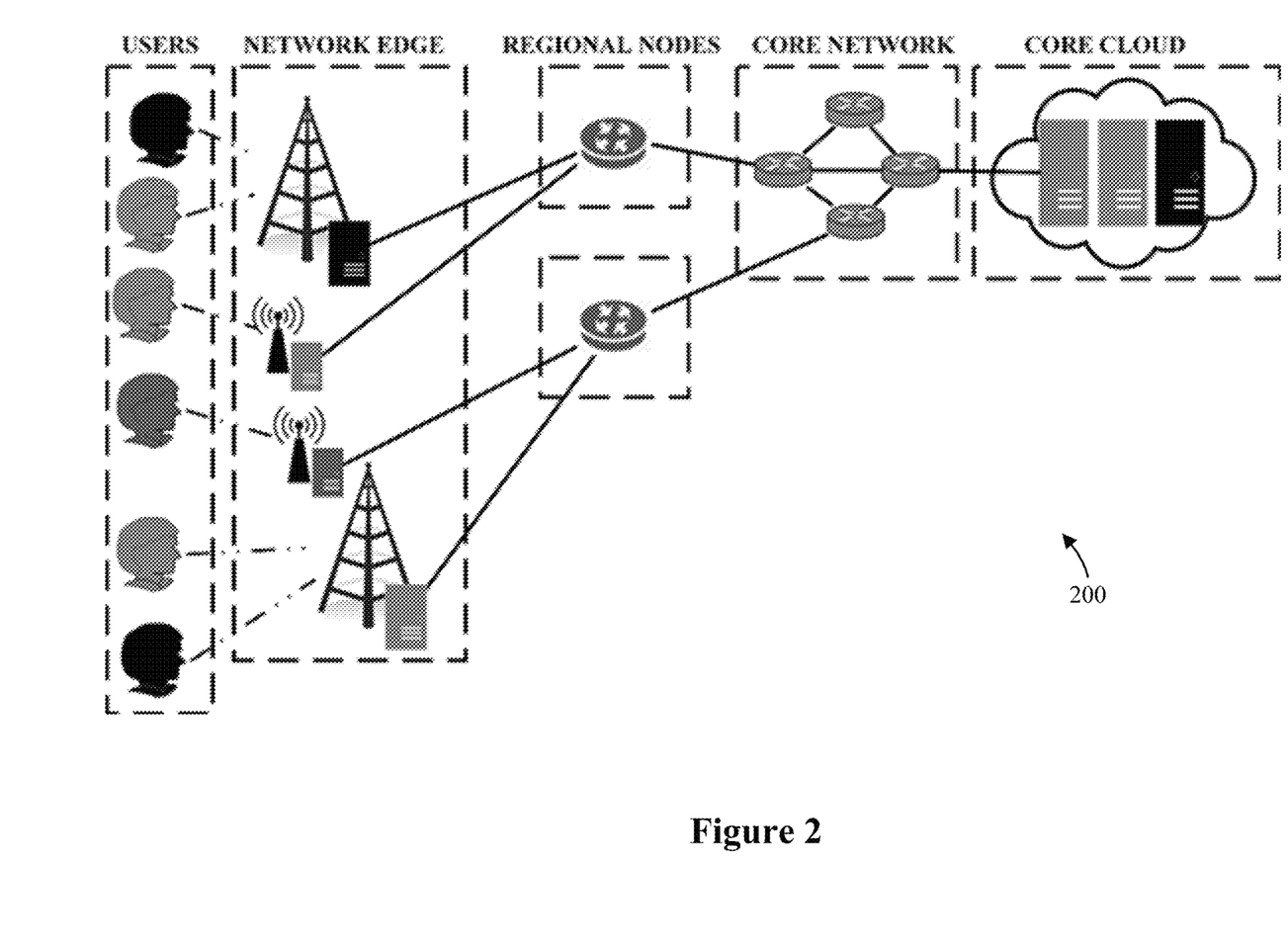
FIG. 2 is a schematic illustration of the MEC architecture.

Referring to FIG. 2, the MEC concept and architecture 200 was first introduced as an extension to the cloud computing paradigm. The idea is to shift some of the computational resources to the edge of the network. This was done in response to the continued growth of connected devices with the National Cable & Telecommunications Association (NCTA), that projected that the number of connected devices will approximately reach 50 billion by the year 2020. Therefore, a need has risen to manage, process, and store the resulting data being generated more locally. Additionally, new business models, use cases, and applications have emerged that require real-time processing and response. Therefore, the adoption and deployment of MEC infrastructure has helped reduce the latency experienced by users. Moreover, it also helped decrease the signaling overhead in the cloud core. This is due to the processing of data being collected and exchanged at the edge nodes rather than at the core.

The development and deployment of MEC technologies opened up the door to a variety of services and applications. In what follows, a brief description of how MEC plays a role in some applications is presented.

Smart homes and buildings: One application that MEC technology is enabling is smart homes and buildings. In particular, MEC offers processing and storage capabilities for the large amount of data generated by the sensors and various connected appliances within a smart home or building. For example, it can help analyze energy consumption patterns based on data collected from smart energy meters.

Smart cities: An extension to the smart homes and buildings applications is the smart communities and smart cities application. For example, videos recorded through cameras around the city can be analyzed for routing decisions. Another example is that a video recorded of a particular monument or location by one user can be cached in a nearby edge node for other users to stream.

Healthcare: A third application for MEC technology is healthcare. For example, remote surgeries can be completed with the help and support of MEC. Another example is humanoid robots that can offer care-taking services to elderly patients using information collected with MEC technology.

Augmented and virtual reality: MEC technologies can play a significant role in supporting augmented reality (AR) and virtual reality (VR) applications. One example is placing a VR control center at a MEC server to improve the tracking accuracy of VR applications.

Retail: Retail is another application that can benefit from MEC technology. For example, MEC servers can be used to provide WiFi connection to retail store users. MEC servers can also be used to offer smart vending machines and shelves.

Autonomous and connected vehicles: Another application that MEC technologies enables is autonomous and connected vehicles within intelligent transportation systems. For example, MEC servers can be used for real-time traffic monitoring and analysis at intersections.

MEC technology will play a major role in future networks and applications as it has the potential to support many real-time and latency-sensitive applications. In this work, the focus is set on the use of MEC in the context of V2X applications and services placement.

Figure 3:
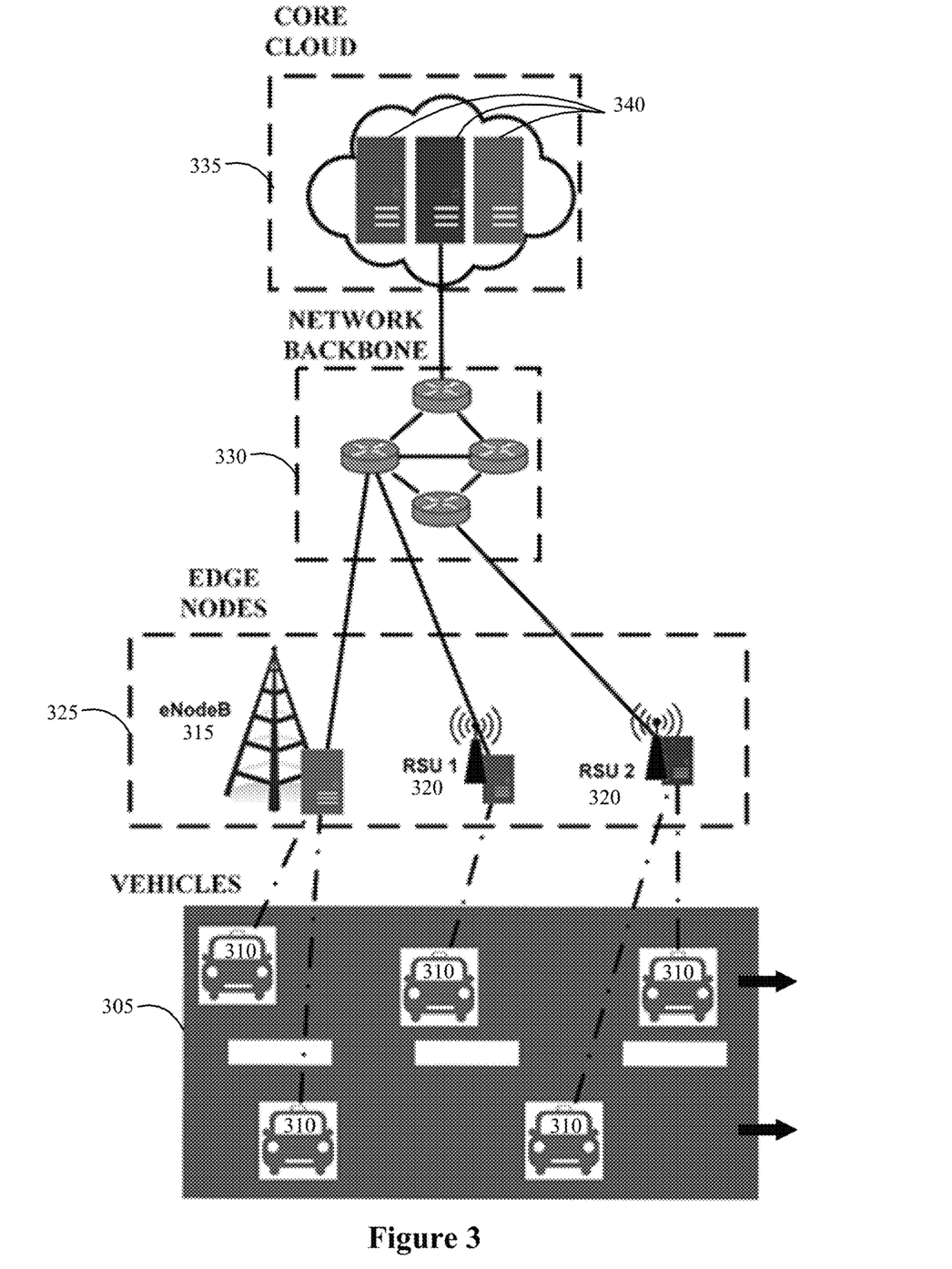
FIG. 3 is a schematic illustration of the system model.

Referring to FIG. 3, there is a uni-directional multiple-lane highway 305 environment in which it is assumed that the vehicles 310 are moving at constant speed with equal distance separation between them. This mimics vehicles along a highway between cities. It is also assumed that the highway segment is covered with LTE-A using multiple evolved NodeB (eNB) 315 base stations. However other radio technologies could be used alternatively. Additionally, multiple road side units (RSUs) 320 are assumed to be placed along the road. Each eNB 315 or RSU 320 is equipped with a MEC host having a given set of computing power (central processing unit (CPU), memory, and storage). These eNBs 315 and RSUs 320 form the network access edge 325. Also, the network access edge 325 is assumed to be connected via the network backbone 330 to a core cloud data center 335 that hosts a set of servers 340 with larger computing power.

Three different types of V2X services are considered, each representing one use case of different V2X applications. A brief discussion of each service and its corresponding requirements is presented below.

Cooperative Awareness Basic Service: The cooperative awareness basic service is one of the traffic safety use cases and is characterized by the cooperative awareness message (CAM) that is periodically shared between the vehicles and the network road nodes. Information about the vehicles position, movement, and other sensor data is exchanged using the CAM message. Using this information, vehicles make the needed modifications to their behavior (speed, direction, etc.). Because this service represents a traffic safety use case, it has a stringent latency/delay requirement that is typically between 10-20 ms.

Decentralized Environmental Notification Basic Service: The decentralized environmental notification is a basic service characterized by the decentralized environmental notification message (DENM). This message is sent to notify road users of particular events such as traffic condition warning, road-work warning, and signal violation warning. This service is considered to be a hybrid use case between the V2X traffic efficiency and V2X traffic safety applications. Therefore, this service has a slightly less stringent latency/delay requirement, tolerating latencies up to 100 ms.

Media Downloading and Streaming: Media downloading and streaming is a use case of the V2X Infotainment applications. Such a service provides on-demand information or entertainment to vehicle users on either commercial or non-commercial basis. Accordingly, this service has the least stringent requirement. More specifically, latencies up to 1 second are tolerated.

Referring again to FIGS. 2 and 3, an example illustrating how V2X services and applications can be chained at different levels is now described. As it will be seen, some applications or services are best placed in a central or core cloud 335 while other applications or services are best placed regionally in the network backbone 330 or in regional nodes (FIG. 2) and finally some applications or services are best placed at the edge 325.

For example, a central traffic management application or service can be placed in the core cloud 335. Such an application can accumulate the status for all the road network and all connected vehicles in a given geographical area. This central traffic management application or service can be in communication with regional traffic management applications or services placed in the backbone network 330. These regional traffic management applications or services can exchange information with the central traffic management application or service for general operation and can exchange information among themselves e.g. concerning vehicles transiting from one region to another. Local traffic management applications or services can be placed at the edge 325. These applications or services can interface with sensors, traffic cameras and any input/output devices. These applications or services can be running in edge nodes such as eNodeB 315 or RSU 320, which can get in communication with the connected vehicles 310. More complex applications or services for treating sensor data, such as image analysis applications or services, receiving images from traffic cameras can either run at the edge 325, in the backbone network 330, or even in the core cloud 335, depending on the resources needed and latency requested for treating the information, while simpler applications or services treating data or information that are less computationally demanding or more delay sensitive can run closer to or at the edge 325.

V2X incorporates the concept of cooperative awareness for other external information services, which can be taken advantage of, as described in the below example.

Let's consider a V2X highway safety speed reduction application comprising applications or services that are chained and that are placed at different levels in the network depicted in FIGS. 2 and 3. In this example, a vehicle 310 is driving on a major highway and is V2X capable. V2X transponder sites are available along the highway and have their applications or services running in RSUs 320 at the edge of the network. When a traffic jam forms, e.g. 5 km down the road from the V2X capable vehicle, it is captured by a traffic camera which has an application or service running at the edge, in RSU 320, for capturing the images. An image processing application or service, interfacing with the application or service that captured the images (chained using service chaining), is located in the backbone network 330 for processing the images. Location in the backbone network may be chosen based on geography, on latency and/or on processing capacity requirements. Once the images are analysed, processed information can be sent to a central cloud V2X speed reduction application or service interfacing the image analysis application or service (chained using service chaining). The central cloud V2X speed reduction application or service is therefore triggered by the traffic jam camera through a series of operations effected by different services along the chain of services. The central cloud V2X speed reduction application or service may run either in a regional node in the backbone network 330 or in a node in the core cloud 335. The speed reduction application or service makes calculations and determines which V2X capable vehicles will be affected by the detected traffic jam, taking into account their velocity and geographic distance to the traffic jam. The speed reduction application or service sends commands to these V2X capable vehicles through another interface (chained using service chaining) e.g. using V2X transponders or transmitters at the edge 325. These transponders or transmitters at the edge 325 transfer the commands to the V2X capable vehicle (and possibly also to other V2X capable vehicles) in the area or approaching the traffic jam, e.g. to adjust to a proper speed or to stop, using speed information requests and speed reductions orders.

An analytical optimization model called cost-optimal V2X Service Placement (CO-VSP), for V2X services in a distributed cloud/edge environment, that minimizes the cost of placing V2X services on computing nodes while satisfying various delay, computation resource availability, and placement constraints will now be described.

Table 1 presents mathematical notations of this work. Moreover, the decision variable is defined in (1).

$$X_s^c = \begin{cases} 1, & \text{if V2X service/application } s \text{ is placed on computing node } c. \\ 0, & \text{otherwise.} \end{cases} \quad (1)$$

TABLE 1

Key Mathematical Notations

| Set | Description |
|---|---|
| S | Set of V2X services/applications instances to be placed |
| U | Set of unique V2X services/applications |
| $S_u$ | Subset of V2X services/applications of type u ∈ U |
| C | Set of available computing nodes (core node or edge node) to host the V2X services |
| V | Set of vehicles accessing V2X services instances |
| $d_{s,v}^c$ | Delay experienced by vehicle v served by V2X service instance s if placed at computing node c |
| $D_s^{th}$ | Delay/latency threshold of V2X service s |
| $R_s^i$ | Computational resource requirement of V2X service s where i ∈ {CPU, memory, storage} |
| $Cap_c^i$ | Available computational resource i at computing node c |
| $cost_s^c$ | Cost of placing V2X service s at computing node c |

Problem Formulation: Based on the previous description, the cost-optimal V2X service placement (CO-VSP) model in a distributed core/edge computing environment can be formulated as follows.

Objective Function: Equation (2) aims to minimize the aggregate cost of placing the V2X services instances.

$$\min \Sigma_{s \in S} \Sigma_{c \in C} X_s^c * cost_s^c \quad (2)$$

Delay Constraint: Equation (3) ensures that the average delay/latency experienced by the vehicles being served by V2X service instance s is less than the maximum delay/latency threshold of the service.

$$\sum_{c \in C} X_s^c \left( \frac{1}{|V|} \sum_{v \in V} d_{s,v}^c \right) \leq D_s^{th}; \forall s \in S \quad (3)$$

Computational Resource Availability Constraint: Equation (4) ensures that the aggregate computational resource requirement of the placed V2X service instances does not exceed the available computational resources at each computing node c.

$$\Sigma_{s \in S} X_s^c R_s^i \leq Cap_c^i; \forall c \in C, \forall i \in \{CPU, memory, storage\} \quad (4)$$

Placement Constraint: Equation (5) ensures that each instance s is placed at one computing node.

$$\Sigma_{c \in C} X_s^c = 1; \forall s \in S \quad (5)$$

Unique Service Placement Constraint: Equation (6) ensures that different instances of unique V2X service/application of type u are placed at different computing nodes for redundancy purposes.

$$\Sigma_{s \in S_u} X_s^c \leq 1; \forall c \in C; \forall u \in U \quad (6)$$

Based on the fact that this problem is a binary integer linear programming problem, it is considered to be an NP-complete problem. This is further emphasized when determining the problem's search space. More specifically, the search space for this problem is $2^{|C||S|}$ where |C| is the number of computing nodes and |S| is the number of V2X services to be placed. Accordingly, for the case of |C|=10 and |S|=10, the search space is $1.267 \times 10^{30}$. This makes solving such a problem computationally expensive due to the exponential growth in the search space. Therefore, a lower-complexity heuristic algorithm is needed to solve this problem.

The Delay-Aware V2X Service Placement (DA-VSP) Algorithm has therefore been developed to solve the V2X service placement problem. The algorithm searches for a node that fulfills delay and computing resources requirements. Algorithm 1 provides the pseudo-code of the DA-VSP heuristic algorithm.

Algorithm 1 Delay - Aware V2X Service Placement (DA-VSP)

| Input: | U = {1,2, ..., |U|}, S = {1,2,$S_1$, ..., |S|} |
|---|---|
| | C = {1,2, ..., |C|}, V = {1,2, ..., |V|} |
| | $Cost_c$ = {$Cost_1$, $Cost_2$, ..., $Cost_C$} |
| Output: | $X_{s_u}^c$, Agg Cost = $\Sigma_{s \in S} \Sigma_{c \in C} X_s^c * Cost_c$ |
| 1: | define $X_{s_u} = \Sigma_{c \in C} X_{s_u}^c$ |
| 2: | set $U_{sort}$ = Asc Sort(U) |
| 3: | for u ∈ $U_{sort}$ do |
| 4: |   for $s_u \in S_u$ do |

-continued

Algorithm 1 Delay - Aware V2X Service Placement (DA-VSP)

5:   define $d_{s_u}^c = \left(\frac{1}{|V|}\sum_{v \in V} d_{s,v}^c\right)$
6:   while $X_{s_u}^c \neq 1$ do
7:     find $cost_{s_u}^c = \min_{c \in C} Cost_c$
8:     if Rem $Cap_c > R_{s_u}$ & $d_{s_u}^c < D_{s_u}^{th}$ then
9:       set $X_{s_u}^c = 1$
10:      update Rem $Cap_c$ = Rem $Cap_c - R_{s_u}$
11:      update C = C \ c
12:    else
13:      update $cost_{s_u}^c = \infty$
14:    end if
15:   end while
16:  end for
17: end for
18: return $X_{s_u}^c$, Agg Cost Upon defining a mock variable indicating whether a V2X service instance was placed or not (line 1), the algorithm sorts the unique services in ascending order of delay tolerance. The algorithm then iterates through the instances of each unique service type. For each instance, the algorithm finds the computing node with the minimum deployment cost and checks if this node satisfies both the delay and computational resource constraints. If it does, the decision variable is set to 1, the computing resources available at node c are updated, and node c is removed from the set of available computing nodes for all other instances of type u. If the any of the constraints is not satisfied, the algorithm ignores the current node, moves on to the computing nodes with the second least deployment cost, and checks again. This is repeated until all service instances of all unique service types are placed (lines 3-16).

The time complexity order of DA-VSP algorithm is $O(|C||S|)$, where $|C|$ is the number of computing nodes and $|S|$ is the number of V2X services to be placed. This is because $|C|$ potential nodes are considered to place each of the V2X service instances in every iteration. Accordingly, using the same values as in the previous example, the complexity would be in the order of 100 operations.

Figure 4:
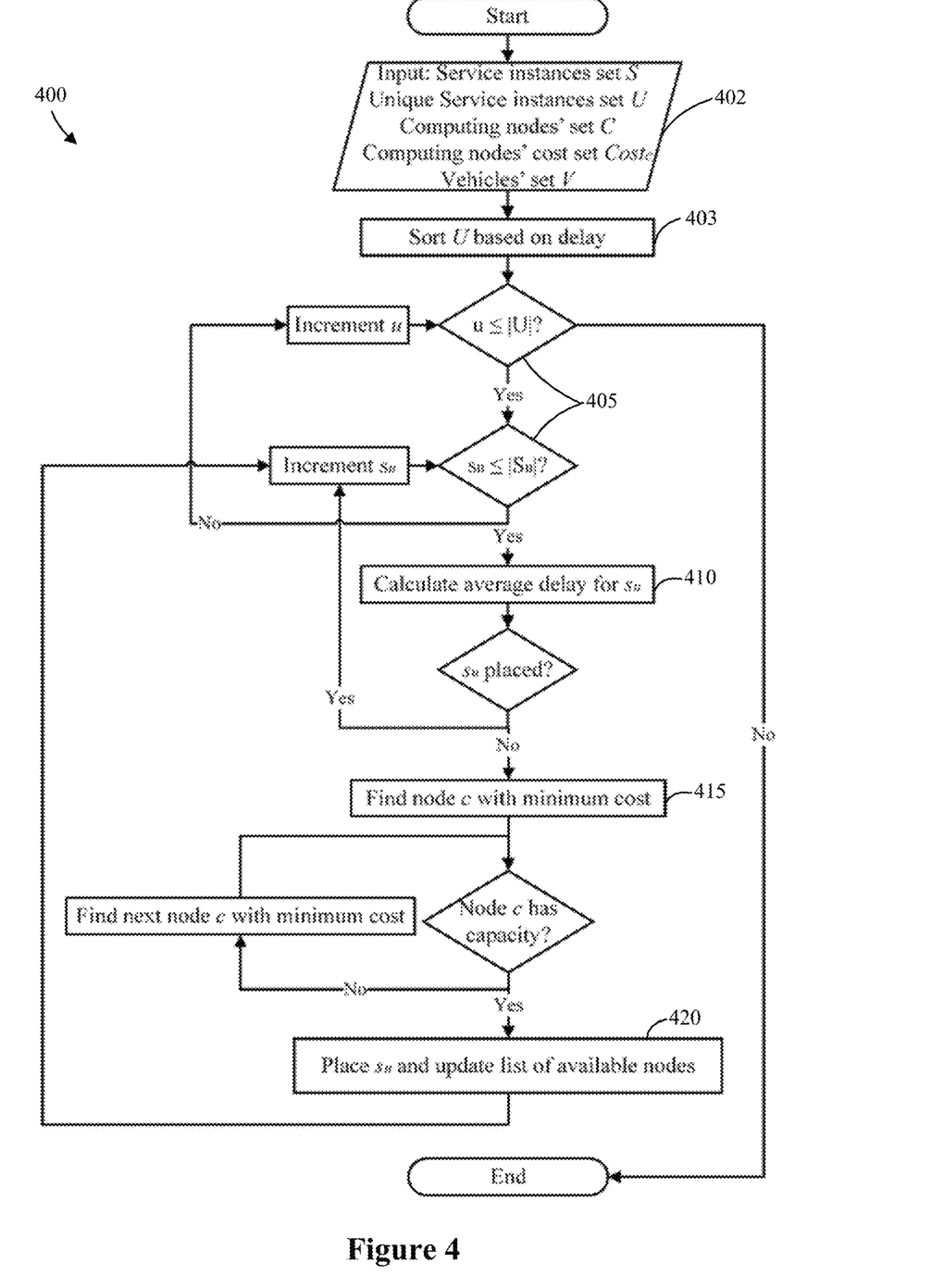
FIG. 4 is flowchart of a method for service placement.

Referring to FIG. 4, there is provided a method 400 for service placement in a multi-access/mobile edge computing (MEC) system, comprising iteratively 405, for each subset of services or applications $s_u$ of each type u, u being element of a set of U of unique V2X services or applications sorted in order of latency requirement: calculating, 410, an average latency for the subset of services or applications $s_u$; selecting, 415, a node c providing a latency smaller than or equal to the calculated average latency and providing enough capacity to run the subset of services or applications $s_u$; placing, 420, the subset of services or applications $s_u$ on the node c; and updating a list of available nodes.

The method may further comprise receiving as input, 402, a set S of subsets of V2X services or applications instances $s_u$ to be placed, the set U of unique V2X services or applications and a set C of computing nodes c operative to host the V2X services or applications and sorting, 403, the set of U of unique V2X services or applications in order of latency requirement.

In the method, the average delay for the subset of services or applications $s_u$ can be computed using $$\sum_{c \in C} X_s^c \left(\frac{1}{|V|}\sum_{v \in V} d_{s,v}^c\right); \forall s \in S$$

where:

$$X_s^c = \begin{cases} 1, & \text{if V2X service/application } s \text{ is placed on} \\ & \text{computing node } c, \\ 0, & \text{otherwise,} \end{cases}$$

v is a vehicle accessing V2X services instances,
V is a set of vehicles accessing V2X services instances, and
$d_{s,v}^c$ is the latency experienced by vehicle v served by a V2X service instance s if placed at computing node c.

In the method, the step of selecting may further comprise, checking if the node c provides enough capacity to run the subset of services or applications $s_u$.

In the method, checking if the node c provides enough capacity to run the subset of services or applications $s_u$ may comprise checking if a remaining capacity at node c is greater than the computational resource requirement of the V2X service or application instances s composing the subset $s_u$ and if a latency experienced by each vehicle v served by V2X a service or application instance s if placed at computing node c is smaller than a delay/latency threshold predefined for the V2X service or application instance s.

In the method, checking if the node c provides enough capacity to run the subset of services or applications $s_u$ may comprise checking that:

$$\Sigma_{s \in S} X_s^c R_s^i \leq Cap_c^i; \forall c \in C, \forall i \in \{CPU, memory, storage\}, \text{ where:}$$

$$X_s^c = \begin{cases} 1, & \text{if V2X service/application } s \text{ is placed on} \\ & \text{computing node } c, \\ 0, & \text{otherwise,} \end{cases}$$

$R_s^i$ is the computational resource requirement of V2X service or application instance s, where
$i \in \{CPU, memory, storage\}$, and
$Cap_c^i$ is the available computational resource i at computing node c.

In the method, updating the list of available nodes may further comprise updating a remaining capacity of node c by deducting the capacity required by the subset of services or applications $s_u$ and removing c from the set C of computing nodes to host the V2X services if c has reached full capacity.

In the method, the node c is selected between edge nodes, network backbone nodes and core cloud nodes.

In the method, an edge node may be selected when the average latency requested for the subset of services or applications $s_u$ is less than or equal to 100 milliseconds, a network backbone node may be selected when the average latency requested for the subset of services of applications $s_u$ is greater than 100 milliseconds and less than or equal to 500 milliseconds, and a core cloud node may be selected when the average latency requested for the subset of services of applications $s_u$ is greater than 500 milliseconds.

The method may further comprise, when redundancy of the subset of the services or applications $s_u$ is requested, placing each service or application instance s of the subset $s_u$ individually on different nodes c and ensuring redundancy using:

$$\Sigma_{s \in S_u} X_s^c \leq 1; \forall c \in C; \forall u \in U, \text{ where:}$$

$$X_s^c = \begin{cases} 1, & \text{if V2X service/application } s \text{ is placed on} \\ & \text{computing node } c, \\ 0, & \text{otherwise.} \end{cases}$$

Performance Evaluation: A MATLAB-based simulator was developed to evaluate the performance of the proposed CO-VSP model in terms of deployment cost, average delay/latency, and computational resource utilization.

Simulation Setup: An LTE-based V2X system supporting three different services, namely CAM service, DENM service, and media downloading service is used. The delay tolerance threshold for these services are set at 20, 50, and 150 ms respectively. Additionally, the CAM service is modeled as a medium sized virtual machine (VM) with low computational requirements due to the local update status of this service. In a similar fashion, DENM service is modeled as large-sized VM. This is because it processes more data about the traffic conditions, which results in a higher computational requirement. Lastly, the media downloading service is considered to be an extra-large VM to be able to support and satisfy the different requests for media download.

For the physical environment, a highway scenario consisting of 2 lanes, each 2 km long is considered. Moreover, it is assumed that there are 2 core nodes, 3 eNBs and 5 RSUs. Each core node has 32 GB of CPU, 64 GB of memory, and 240 GB of storage. Similarly, each eNB and RSU has 8 GB of CPU, 16 GB of memory, and 240 GB of storage. Moreover, the delays/latencies are considered to be uniformly distributed with Vehicle-to-RSU delay in the range of 1-10 ms, Vehicle-to-eNB delay in the range 20-40 ms, and Vehicle-to-core delay in the range 60-130 ms. Finally, the number of vehicles changes between 20 and 100 vehicles with a step size of 20.

Figure 5:
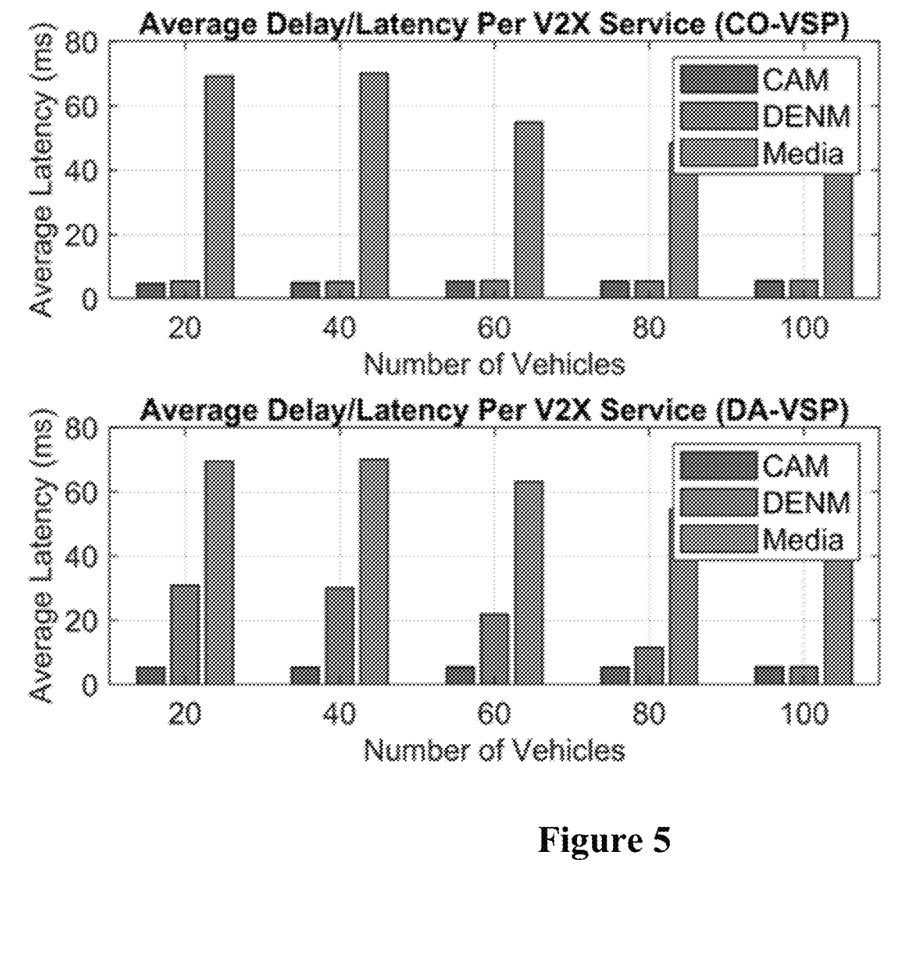
FIGS. 5-6 are graphical representations of results obtained with the method for service placement.

Results and Discussion: FIG. 5 shows the average delay/latency of the different V2X services. Despite the fact that the proposed CO-VSP model guarantees the QoS requirements of the different V2X service, the trade-off between operational efficiency and delay/latency is clearly evident. As the number of vehicles increases, the average operational efficiency for media services decreases while its average delay/latency increases. This is because more media downloading instances are placed at the edge with the increasing number of vehicles. In contrast, CAM and DENM services remain stable in terms of latency. This is due to the stringent delay requirements of such services which force the model to always place them at the edge rather than the core cloud nodes. The same observations apply when the DA-VSP heuristic algorithm is considered. Moreover, it can be seen that the DA-VSP algorithm achieves close to optimal performance while having lower computational complexity. This is because it also tries to find the computing node with the least cost that can satisfy the delay constraint.

Figure 6:
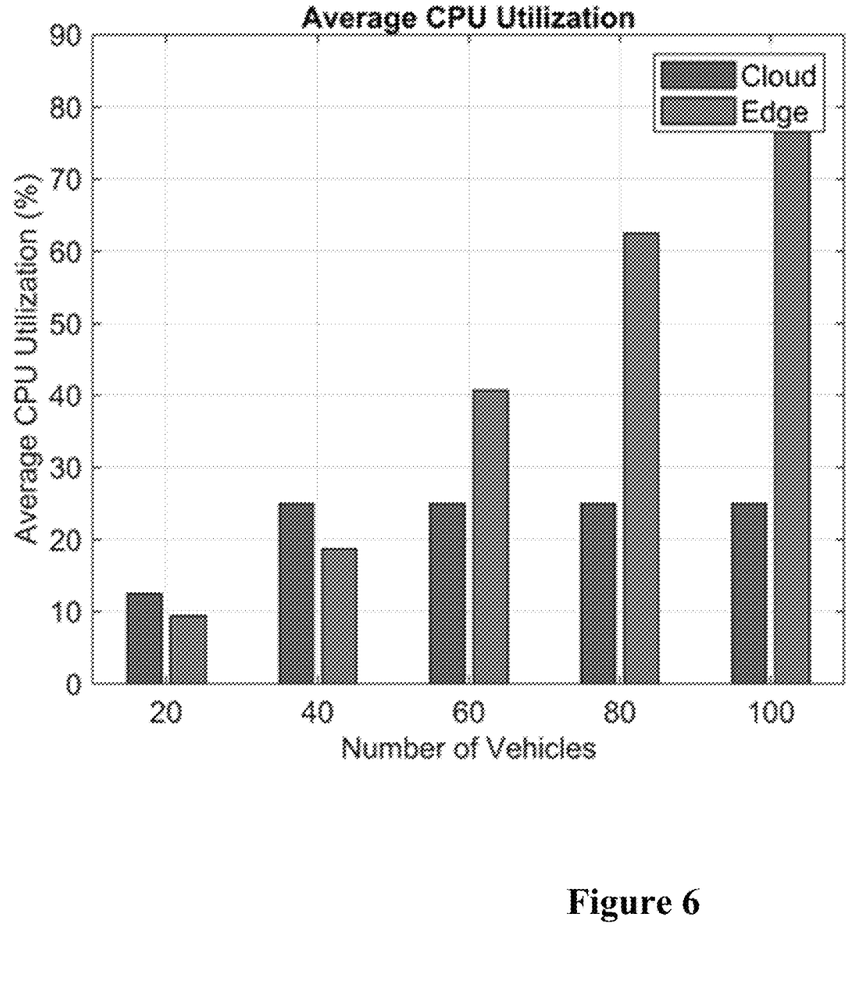

FIG. 6 illustrates the average CPU utilization in both the cloud and edge nodes. As expected, the CPU utilization at the edge increases with the increased number of vehicles. Again, this is due to the increased number of media downloading service instances that move away from the core cloud and are placed at the edge. On the other hand, the cloud utilization becomes stable due to the limited number of instances it can host to satisfy the unique service placement constraint, which forces the model to place some of the delay-tolerant services closer to the user, thus increasing the edge's utilization.

Figure 7:
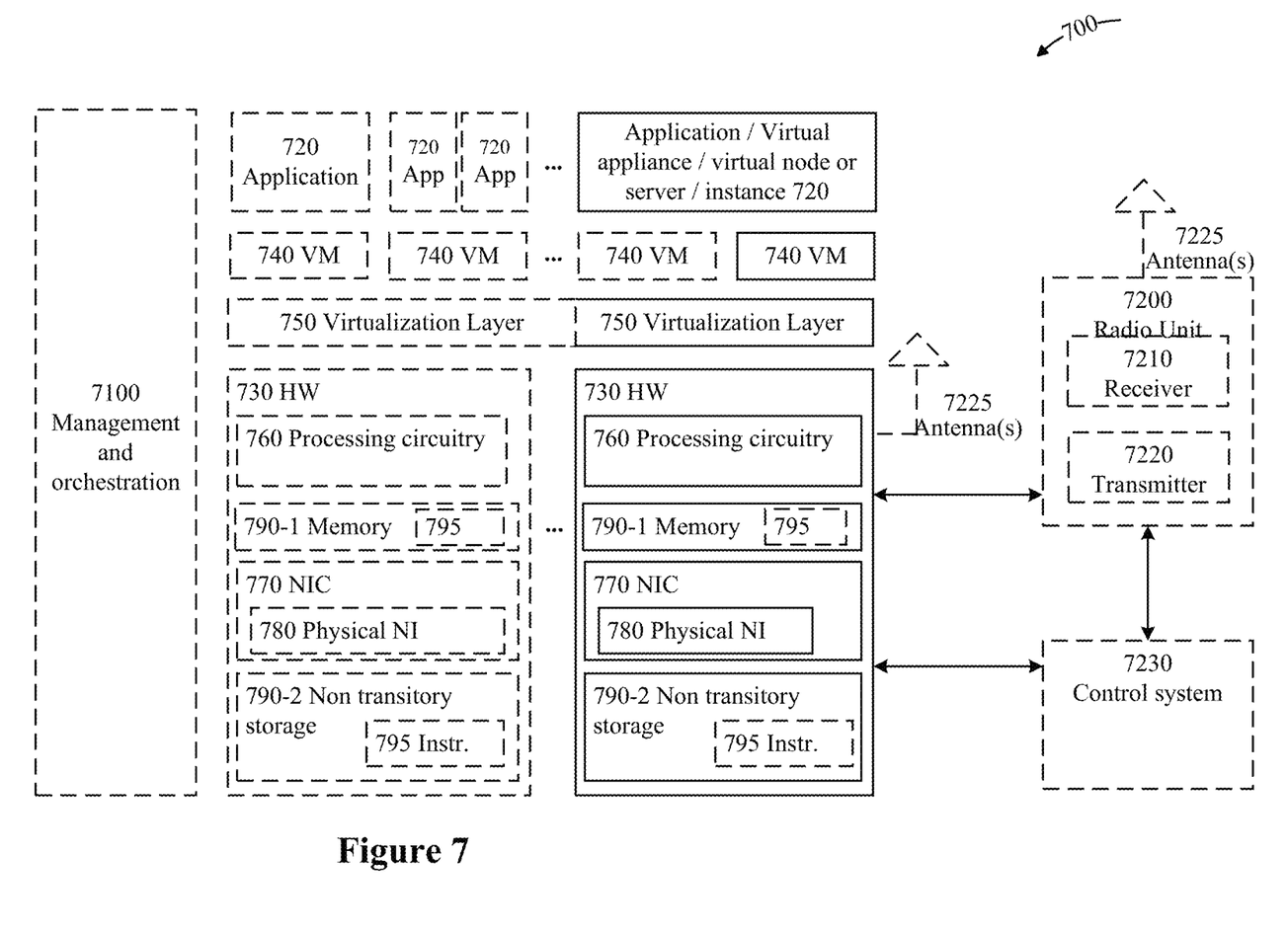
FIG. 7 is a schematic illustration of a virtualization environment in which the different methods and apparatus described herein can be deployed.

FIG. 7 is a schematic block diagram illustrating a virtualization environment 700 in which some steps or functions may be implemented. As used herein, virtualization can be applied to a node (e.g., a virtualized base station or a virtualized radio access node) or to a device (e.g., a UE, a wireless device or any other type of communication device) and relates to an implementation in which at least a portion of the functionality is implemented as one or more virtual components (e.g., via one or more applications, components, functions, virtual machines or containers executing on one or more physical processing nodes in one or more networks).

Some or all of the functions described herein may be implemented as virtual components executed by one or more virtual machines or containers implemented in one or more virtual environments 700 hosted by one or more of hardware nodes 730. Further, when the virtual node is not a radio access node or does not require radio connectivity (e.g., a core network node), then the network node may be entirely virtualized.

The functions may be implemented by one or more applications 720 (which may alternatively be called software instances, virtual appliances, network functions, virtual nodes, virtual network functions, etc.) operative to implement steps of some methods described herein. Applications 720 run in virtualization environment 700 which provides hardware 730 comprising processing circuitry 760 and memory 790. Memory 790 contains instructions 795 executable by processing circuitry 760 whereby application 720 is operative to provide any of the relevant features, benefits, and/or functions disclosed herein.

Virtualization environment 700, comprises general-purpose or special-purpose network hardware devices 730 comprising a set of one or more processors or processing circuitry 760, which may be commercial off-the-shelf (COTS) processors, dedicated Application Specific Integrated Circuits (ASICs), or any other type of processing circuitry including digital or analog hardware components or special purpose processors. Each hardware device may comprise memory 790-1 which may be non-persistent memory for temporarily storing instructions 795 or software executed by the processing circuitry 760. Each hardware devices may comprise one or more network interface controllers 770 (NICs), also known as network interface cards, which include physical network interface 780. Each hardware devices may also include non-transitory, persistent, machine readable storage media 790-2 having stored therein software 795 and/or instruction executable by processing circuitry 760. Software 795 may include any type of software including software for instantiating one or more virtualization layers 750 (also referred to as hypervisors), software to execute virtual machines 740 or containers as well as software allowing to execute functions described herein.

Virtual machines 740 or containers, comprise virtual processing, virtual memory, virtual networking or interface and virtual storage, and may be run by a corresponding virtualization layer 750 or hypervisor. Different instances of virtual appliance 720 may be implemented on one or more of virtual machines 740 or containers, and the implementations may be made in different ways.

During operation, processing circuitry 760 executes software 795 to instantiate the hypervisor or virtualization layer 750, which may sometimes be referred to as a virtual machine monitor (VMM). Virtualization layer 750 may present a virtual operating platform that appears like networking hardware to virtual machine 740 or to a container.

As shown in FIG. 7, hardware 730 may be a standalone network node, with generic or specific components. Hardware 730 may comprise antenna 7225 and may implement some functions via virtualization. Alternatively, hardware 730 may be part of a larger cluster of hardware (e.g. such as in a data center or customer premise equipment (CPE)) where many hardware nodes work together and are managed via management and orchestration (MANO) 7100, which, among others, oversees lifecycle management of applications 720.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, a virtual machine 740 or container is a software implementation of a physical machine that runs programs as if they were executing on a physical, non-virtualized machine. Each of virtual machines 740 or container, and that part of the hardware 730 that executes that virtual machine, be it hardware dedicated to that virtual machine and/or hardware shared by that virtual machine with others of the virtual machines 740 or containers, forms a separate virtual network elements (VNE).

Still in the context of NFV, Virtual Network Function (VNF) is responsible for handling specific network functions that run in one or more virtual machines 740 or containers on top of hardware networking infrastructure 730 and corresponds to application 720 in FIG. 7.

One or more radio units 7200 that each include one or more transmitters 7220 and one or more receivers 7210 may be coupled to one or more antennas 7225. Radio units 7200 may communicate directly with hardware nodes 730 via one or more appropriate network interfaces and may be used in combination with the virtual components to provide a virtual node with radio capabilities, such as a radio access node or a base station.

Some signaling can be effected with the use of control system 7230 which may alternatively be used for communication between the hardware nodes 730 and the radio units 7200.

There is provided an apparatus or hardware 730 for service placement in a multi-access/mobile edge computing (MEC) system comprising processing circuits 760 and a memory 790, the memory containing instructions executable by the processing circuits whereby the apparatus is operative to: iteratively, for each subset of services or applications $s_u$ of each type u, u being element of a set of U of unique V2X services or applications sorted in order of latency requirement: calculate an average latency for the subset of services or applications $s_u$; select a node c providing a latency smaller than or equal to the calculated average latency and providing enough capacity to run the subset of services or applications $s_u$; place the subset of services or applications $s_u$ on the node c; and update a list of available nodes.

The apparatus may be further operative to receive as input a set S of subsets of V2X services or applications instances $s_u$ to be placed, the set U of unique V2X services or applications and a set C of computing nodes c operative to host the V2X services or applications and to sort the set of U of unique V2X services or applications in order of latency requirement.

The average delay for the subset of services or applications $s_u$ may be computed using $$\sum_{c \in C} X_s^c \left( \frac{1}{|V|} \sum_{v \in V} d_{s,v}^c \right); \forall s \in S$$

where:

$$X_s^c = \begin{cases} 1, & \text{if V2X service/application } s \text{ is placed on computing node } c, \\ 0, & \text{otherwise,} \end{cases}$$

v is a vehicle accessing V2X services instances,
V is a set of vehicles accessing V2X services instances, and
$d_{s,v}^c$ is the latency experienced by vehicle v served by a V2X service instance s if placed at computing node c.

The apparatus may be further operative to check if the node c provides enough capacity to run the subset of services or applications $s_u$.

The apparatus may be further operative to check if a remaining capacity at node c is greater than the computational resource requirement of the V2X service or application instances s composing the subset $s_u$ and if a latency experienced by each vehicle v served by V2X a service or application instance s if placed at computing node c is smaller than a delay/latency threshold predefined for the V2X service or application instance s.

The apparatus may be further operative to check if the node c provides enough capacity to run the subset of services or applications $s_u$ by checking that:

$$\Sigma_{s \in S} X_s^c R_s^i \leq Cap_c^i; \forall c \in C, \forall i \in \{CPU, memory, storage\}, \text{ where:}$$

$$X_s^c = \begin{cases} 1, & \text{if V2X service/application } s \text{ is placed on computing node } c, \\ 0, & \text{otherwise,} \end{cases}$$

$R_s^i$ is the computational resource requirement of V2X service or application instance s, where
i∈{CPU, memory, storage}, and
$Cap_c^i$ is the available computational resource i at computing node c.

The apparatus may be further operative to update a remaining capacity of node c by deducting the capacity required by the subset of services or applications $s_u$ and removing c from the set C of computing nodes to host the V2X services if c has reached full capacity.

The node c may be selected between edge nodes, network backbone nodes and core cloud nodes.

The apparatus may be operative to select: an edge node when the average latency requested for the subset of services or applications $s_u$ is less than or equal to 100 milliseconds, a network backbone node when the average latency requested for the subset of services of applications $s_u$ is greater than 100 milliseconds and less than or equal to 500 milliseconds, and a core cloud node when the average latency requested for the subset of services of applications $s_u$ is greater than 500 milliseconds.

The apparatus may be operative to, when redundancy of the subset of the services or applications $s_u$ is requested, place each service or application instance s of the subset $s_u$ individually on different nodes c and ensure redundancy using:

$$\Sigma_{s \in S_u} X_s^c \leq 1; \forall c \in C; \forall u \in U, \text{ where:}$$

$$X_s^c = \begin{cases} 1, & \text{if V2X service/application } s \text{ is placed on computing node } c, \\ 0, & \text{otherwise.} \end{cases}$$

There is provided a non-transitory computer readable media, such as non transitory storage 790-2 having stored thereon instructions for service placement in a multi-access/mobile edge computing (MEC) system, the instructions comprising: iteratively, for each subset of services or applications $s_u$ of each type u, u being element of a set of U of unique V2X services or applications sorted in order of latency requirement: calculating an average latency for the subset of services or applications $s_u$; selecting a node c providing a latency smaller than or equal to the calculated average latency and providing enough capacity to run the subset of services or applications $s_u$; placing the subset of services or applications $s_u$ on the node c; and updating a list of available nodes.

Modifications will come to mind to one skilled in the art having the benefit of the teachings presented in the foregoing description and the associated drawings. The previous description is merely illustrative and should not be considered restrictive in any way. The scope sought is given by the appended claims, rather than the preceding description, and all variations and equivalents that fall within the range of the claims are intended to be embraced therein. Although specific terms may be employed herein, they are used in a generic and descriptive sense only and not for purposes of limitation.

The invention claimed is:

1. A method for service placement in a multi-access/mobile edge computing (MEC) system, comprising:
   iteratively, for each subset of services or applications $s_u$ of each type u, u being element of a set of U of unique V2X services or applications sorted in order of latency requirement:
   a. calculating an average latency for the subset of services or applications $s_u$;
   b. selecting a node c providing a latency smaller than or equal to the calculated average latency and providing enough capacity to run the subset of services or applications $s_u$;
   c. placing the subset of services or applications $s_u$ on the node c; and
   d. updating a list of available nodes.

2. The method of claim 1, further comprising receiving as input a set S of subsets of V2X services or applications instances $s_u$ to be placed, the set U of unique V2X services or applications and a set C of computing nodes c operative to host the V2X services or applications and sorting the set of U of unique V2X services or applications in order of latency requirement.

3. The method of claim 2, wherein the average latency for the subset of services or applications $s_u$ is computed using $$\sum_{c \in C} X_s^c \left( \frac{1}{|V|} \sum_{v \in V} d_{s,v}^c \right); \forall s \in S$$

where:

$$X_s^c = \begin{cases} 1, & \text{if V2X service/application } s \text{ is placed on computing node } c, \\ 0, & \text{otherwise,} \end{cases}$$

v is a vehicle accessing V2X services instances,
V is a set of vehicles accessing V2X services instances, and
$d_{s,v}^c$ is the latency experienced by vehicle v served by a V2X service instance s if placed at computing node c.

4. The method of claim 1, wherein the step of selecting further comprises, checking if the node c provides enough capacity to run the subset of services or applications $s_u$.

5. The method of claim 4, wherein checking if the node c provides enough capacity to run the subset of services or applications $s_u$ comprises checking if a remaining capacity at node c is greater than the computational resource requirement of the V2X service or application instances s composing the subset $s_u$ and if a latency experienced by each vehicle v served by V2X a service or application instance s if placed at computing node c is smaller than a latency threshold predefined for the V2X service or application instance s.

6. The method of claim 4, wherein checking if the node c provides enough capacity to run the subset of services or applications $s_u$ comprises checking that:

$$\Sigma_{s \in S} X_s^c R_s^i \leq Cap_c^i; \forall c \in C, \forall i \in \{CPU, memory, storage\}, \text{ where:}$$

$$X_s^c = \begin{cases} 1, & \text{if V2X service/application } s \text{ is placed on computing node } c, \\ 0, & \text{otherwise,} \end{cases}$$

$R_s^i$ is the computational resource requirement of V2X service or application instance s, where $i \in \{CPU, memory, storage\}$, and
$Cap_c^i$ is the available computational resource i at computing node c.

7. The method of claim 2, wherein updating the list of available nodes further comprises updating a remaining capacity of node c by deducting the capacity required by the subset of services or applications $s_u$ and removing c from the set C of computing nodes to host the V2X services if c has reached full capacity.

8. The method of claim 1, wherein the node c is selected between edge nodes, network backbone nodes and core cloud nodes.

9. The method of claim 8, wherein:
   an edge node is selected when the average latency requested for the subset of services or applications $s_u$ is less than or equal to 100 milliseconds;
   a network backbone node is selected when the average latency requested for the subset of services of applications $s_u$ is greater than 100 milliseconds and less than or equal to 500 milliseconds; and a core cloud node is selected when the average latency requested for the subset of services of applications $s_u$ is greater than 500 milliseconds.

10. The method of claim 2, further comprising, when redundancy of the subset of the services or applications $s_u$ is requested, placing each service or application instance s of the subset $s_u$ individually on different nodes c and ensuring redundancy using:

$\Sigma_{s \in S_u} X_s^c \leq 1; \forall c \in C; \forall u \in U$, where:

$$X_s^c = \begin{cases} 1, & \text{if V2X service/application } s \text{ is placed on computing node } c, \\ 0, & \text{otherwise.} \end{cases}$$

11. An apparatus for service placement in a multi-access/mobile edge computing (MEC) system comprising processing circuits and a memory, the memory containing instructions executable by the processing circuits whereby the apparatus is operative to:
iteratively, for each subset of services or applications $s_u$ of each type u, u being element of a set of U of unique V2X services or applications sorted in order of latency requirement:
a. calculate an average latency for the subset of services or applications $s_u$;
b. select a node c providing a latency smaller than or equal to the calculated average latency and providing enough capacity to run the subset of services or applications $s_u$;
c. place the subset of services or applications $s_u$ on the node c; and
d. update a list of available nodes.

12. The apparatus of claim 11, further operative to receive as input a set S of subsets of V2X services or applications instances $s_u$ to be placed, the set U of unique V2X services or applications and a set C of computing nodes c operative to host the V2X services or applications and to sort the set of U of unique V2X services or applications in order of latency requirement.

13. The apparatus of claim 12, wherein the average delay for the subset of services or applications $s_u$ is computed using $$\sum_{c \in C} X_s^c \left( \frac{1}{|V|} \sum_{v \in V} d_{s,v}^c \right); \forall s \in S$$

where:

$$X_s^c = \begin{cases} 1, & \text{if V2X service/application } s \text{ is placed on computing node } c, \\ 0, & \text{otherwise,} \end{cases}$$

v is a vehicle accessing V2X services instances,
V is a set of vehicles accessing V2X services instances, and
$d_{s,v}^c$ is the latency experienced by vehicle v served by a V2X service instance s if placed at computing node c.

14. The apparatus of claim 11, further operative to check if the node c provides enough capacity to run the subset of services or applications $s_u$.

15. The apparatus of claim 14, further operative to check if a remaining capacity at node c is greater than the computational resource requirement of the V2X service or application instances s composing the subset $s_u$ and if a latency experienced by each vehicle v served by V2X a service or application instance s if placed at computing node c is smaller than a latency threshold predefined for the V2X service or application instance s.

16. The apparatus of claim 14, further operative to check if the node c provides enough capacity to run the subset of services or applications $s_u$ by checking that:

$\Sigma_{s \in s} X_s^c R_s^i \leq \text{Cap}_c^i; \forall c \in C, \forall i \in \{\text{CPU,memory,storage}\}$, where:

$$X_s^c = \begin{cases} 1, & \text{if V2X service/application } s \text{ is placed on computing node } c, \\ 0, & \text{otherwise,} \end{cases}$$

$R_s^i$ is the computational resource requirement of V2X service or application instance s, where $i \in \{\text{CPU, memory, storage}\}$, and
$\text{Cap}_c^i$ is the available computational resource i at computing node c.

17. The apparatus of claim 12, further operative to update a remaining capacity of node c by deducting the capacity required by the subset of services or applications $s_u$ and removing c from the set C of computing nodes to host the V2X services if c has reached full capacity.

18. The apparatus of claim 11, wherein the node c is selected between edge nodes, network backbone nodes and core cloud nodes.

19. The apparatus of claim 18, operative to select:
an edge node when the average latency requested for the subset of services or applications $s_u$ is less than or equal to 100 milliseconds;
a network backbone node when the average latency requested for the subset of services of applications $s_u$ is greater than 100 milliseconds and less than or equal to 500 milliseconds; and
a core cloud node when the average latency requested for the subset of services of applications $s_u$ is greater than 500 milliseconds.

20. The apparatus of claim 12, operative to, when redundancy of the subset of the services or applications $s_u$ is requested, place each service or application instance s of the subset $s_u$ individually on different nodes c and ensure redundancy using:

$\Sigma_{s \in S_u} X_s^c \leq 1; \forall c \in C; \forall u \in U$, where:

$$X_s^c = \begin{cases} 1, & \text{if V2X service/application } s \text{ is placed on computing node } c, \\ 0, & \text{otherwise.} \end{cases}$$

21. A non-transitory computer readable media having stored thereon instructions for service placement in a multi-access/mobile edge computing (MEC) system, the instructions comprising:
iteratively, for each subset of services or applications $s_u$ of each type u, u being element of a set of U of unique V2X services or applications sorted in order of latency requirement:

a. calculating an average latency for the subset of services or applications $s_u$;
b. selecting a node c providing a latency smaller than or equal to the calculated average latency and providing enough capacity to run the subset of services or applications $s_u$;
c. placing the subset of services or applications $s_u$ on the node c; and
d. updating a list of available nodes.

* * * * *